United States Patent
Kimura

(10) Patent No.: US 10,186,234 B2
(45) Date of Patent: Jan. 22, 2019

(54) MIRROR DEVICE WITH DISPLAY FUNCTION AND METHOD OF CHANGING DIRECTION OF MIRROR DEVICE WITH DISPLAY FUNCTION

(71) Applicant: JVC KENWOOD Corporation, Yokohama-shi, Kanagawa (JP)

(72) Inventor: Tomoko Kimura, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 14 days.

(21) Appl. No.: 15/462,575

(22) Filed: Mar. 17, 2017

(65) Prior Publication Data

US 2017/0193969 A1    Jul. 6, 2017

Related U.S. Application Data

(63) Continuation of application No. PCT/JP2015/074048, filed on Aug. 26, 2015.

(30) Foreign Application Priority Data

Oct. 28, 2014   (JP) ................................ 2014-219020
Jun. 19, 2015   (JP) ................................ 2015-123634

(51) Int. Cl.
| | |
|---|---|
| H04N 5/232 | (2006.01) |
| H04N 7/18 | (2006.01) |
| G02B 27/14 | (2006.01) |
| B60R 1/04 | (2006.01) |
| G09G 5/14 | (2006.01) |

(Continued)

(52) U.S. Cl.
CPC ................. *G09G 5/14* (2013.01); *B60R 1/04* (2013.01); *B60R 1/12* (2013.01); *G06F 3/012* (2013.01); *G09F 9/00* (2013.01); *G09G 5/38* (2013.01); *B60R 2001/1215* (2013.01);

(Continued)

(58) Field of Classification Search
CPC ............ G02B 27/0101; G02B 27/0149; G02B 27/0172

See application file for complete search history.

(56) References Cited

U.S. PATENT DOCUMENTS

2016/0037154 A1* 2/2016 Hung ...................... G06F 3/013 348/47
2016/0337594 A1* 11/2016 Morishita .............. B60K 35/00

FOREIGN PATENT DOCUMENTS

| JP | 2001-191858 A | 7/2001 |
|---|---|---|
| JP | 2002-120649 A | 4/2002 |
| JP | 2014-15198 B1 | 8/2013 |

* cited by examiner

*Primary Examiner* — Nan-Ying Yang
(74) *Attorney, Agent, or Firm* — Nath, Goldberg & Meyer; Stanley N. Protigal; Jerald L. Meyer

(57) ABSTRACT

A mirror device with a display function includes a room mirror with a display function, a direction detection unit, and a switching unit. The room mirror with a display function includes a display panel that displays an image and a half mirror that is provided on a display surface of the display panel. The direction detection unit detects a direction of the room mirror with a display function. The switching unit performs, according to the direction of the room mirror with a display function detected by the direction detection unit, switching between a mirror mode operation, in which the display of the image on the display panel is stopped and a mirror surface of the half mirror is used, and a display mode operation in which the image is displayed on the display panel.

6 Claims, 12 Drawing Sheets

(51) Int. Cl.
*B60R 1/12* (2006.01)
*G09F 9/00* (2006.01)
*G06F 3/01* (2006.01)
*G09G 5/38* (2006.01)

(52) U.S. Cl.
CPC .. *B60R 2001/1253* (2013.01); *G09G 2320/08* (2013.01); *G09G 2340/0492* (2013.01); *G09G 2380/10* (2013.01)

FIG. 5

| DETECTION ANGLE | OPERATION MODE |
| --- | --- |
| -20 | MIRROR MODE |
| -18 | MIRROR MODE |
| -16 | MIRROR MODE |
| -14 | MIRROR MODE |
| -12 | MIRROR MODE |
| -10 | MIRROR MODE |
| -8 | MIRROR MODE |
| -6 | MIRROR MODE |
| -4 | MIRROR MODE |
| -2 | MIRROR MODE |
| 0 | MIRROR MODE |
| +2 | MIRROR MODE |
| +4 | MIRROR MODE |
| +6 | MIRROR MODE |
| +8 | MIRROR MODE |
| +10 | DISPLAY MODE |
| +12 | DISPLAY MODE |
| +14 | DISPLAY MODE |
| +16 | DISPLAY MODE |
| +18 | DISPLAY MODE |
| +20 | DISPLAY MODE |

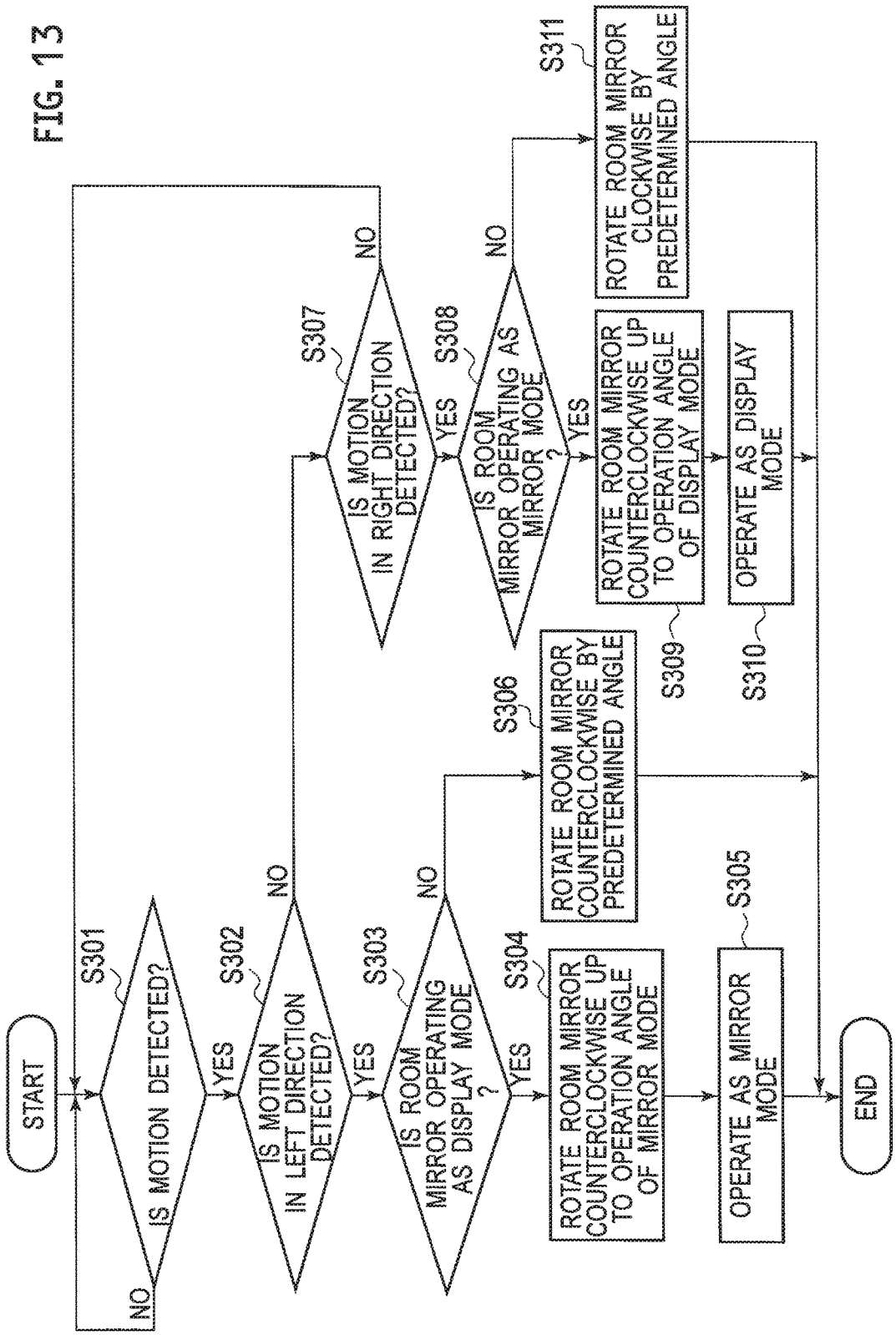

FIG. 15

| DETECTION ANGLE | OPERATION MODE | DISPLAY RANGE |
|---|---|---|
| -20 | MIRROR MODE | |
| -18 | MIRROR MODE | |
| -16 | MIRROR MODE | |
| -14 | MIRROR MODE | |
| -12 | MIRROR MODE | |
| -10 | MIRROR MODE | |
| -8 | MIRROR MODE | |
| -6 | MIRROR MODE | |
| -4 | MIRROR MODE | |
| -2 | MIRROR MODE | |
| 0 | MIRROR MODE | |
| +2 | MIRROR MODE | |
| +4 | MIRROR MODE | |
| +6 | MIRROR MODE | |
| +8 | MIRROR MODE | |
| +10 | DISPLAY MODE | CUTOUT AREA "a" |
| +12 | DISPLAY MODE | CUTOUT AREA "b" |
| +14 | DISPLAY MODE | CUTOUT AREA "c" |
| +16 | DISPLAY MODE | CUTOUT AREA "d" |
| +18 | DISPLAY MODE | CUTOUT AREA "e" |
| +20 | DISPLAY MODE | CUTOUT AREA "f" |

MIRROR DEVICE WITH DISPLAY FUNCTION AND METHOD OF CHANGING DIRECTION OF MIRROR DEVICE WITH DISPLAY FUNCTION

CROSS REFERENCE TO RELATED APPLICATION

This application is a Continuation of PCT Application No. PCT/JP2015/074048, filed on Aug. 26, 2015, and claims the priority of Japanese Patent Application No. 2014-219020, filed on Oct. 28, 2014, and Japanese Patent Application No. 2015-123634, filed on Jun. 19, 2015, the entire contents of all of which are incorporated herein by reference.

BACKGROUND

The present disclosure relates to a mirror device with a display function having both a reflection function and an image display function, and a method of changing a function of the mirror device with a display function.

A room mirror with a display function has been proposed, which is attached to the passenger compartment of an automobile. As a display function, an image of a camera capturing the rear side of the automobile is displayed on the room mirror.

A room mirror is disclosed in Japanese Unexamined Patent Application Publication No. 2001-191858, in which a monitor is provided on a rear surface of a half mirror, and a plurality of camera images are simultaneously displayed on the monitor.

A technique for changing the direction of a room mirror with a partially built-in monitor is disclosed in Japanese Unexamined Patent Application Publication No. 2002-120649.

SUMMARY

When a half mirror is used for a room mirror with a display function, the size of the half mirror is substantially equal to that of a display panel, and by the ON/OFF display function, switching is performed between a display mode operating as the display function, and a mirror mode operating as a mirror function.

When switching between the mirror mode and the display mode is performed using the room mirror with a display function, the direction appropriate to the driver, who is the user, is different in each mode. Therefore, the user needs to perform switching between the respective modes, and appropriately change the direction of the room mirror with a display function in each mode.

A first aspect of the embodiments provides a mirror device with a display function, including: a room mirror with a display function including a display panel that displays an image, and a half mirror that is provided on a display surface of the display panel; a direction detection unit configured to detect a direction of the room mirror with a display function; and a switching unit configured to perform, according to the direction of the room mirror with a display function detected by the direction detection unit, switching between a mirror mode operation, in which the display of the image on the display panel is stopped and a mirror surface of the half mirror is used, and a display mode operation in which the image is displayed on the display panel.

A second aspect of the embodiments provides a method of changing a function of a mirror device with a display function, including: detecting a direction of a room mirror with a display function including a display panel that displays an image and a half mirror that is provided on a display surface of the display panel; and according to the detected direction of the room mirror with a display function, performing switching between a mirror mode operation, in which the display of the image on display panel is stopped and a mirror surface of the half mirror is used, and a display mode operation in which the image is displayed on the display panel.

BRIEF DESCRIPTION OF THE DRAWINGS

FIG. 5 is a diagram illustrating an example of correspondence between a detection angle and an operation mode.

FIG. 13 is a flowchart illustrating a method of changing a function of the mirror device with a display function according to the second embodiment.

FIG. 15 is a diagram illustrating an example of correspondence between a detection angle, an operation mode, and a display range in the third embodiment.

DETAILED DESCRIPTION

Figure 1:
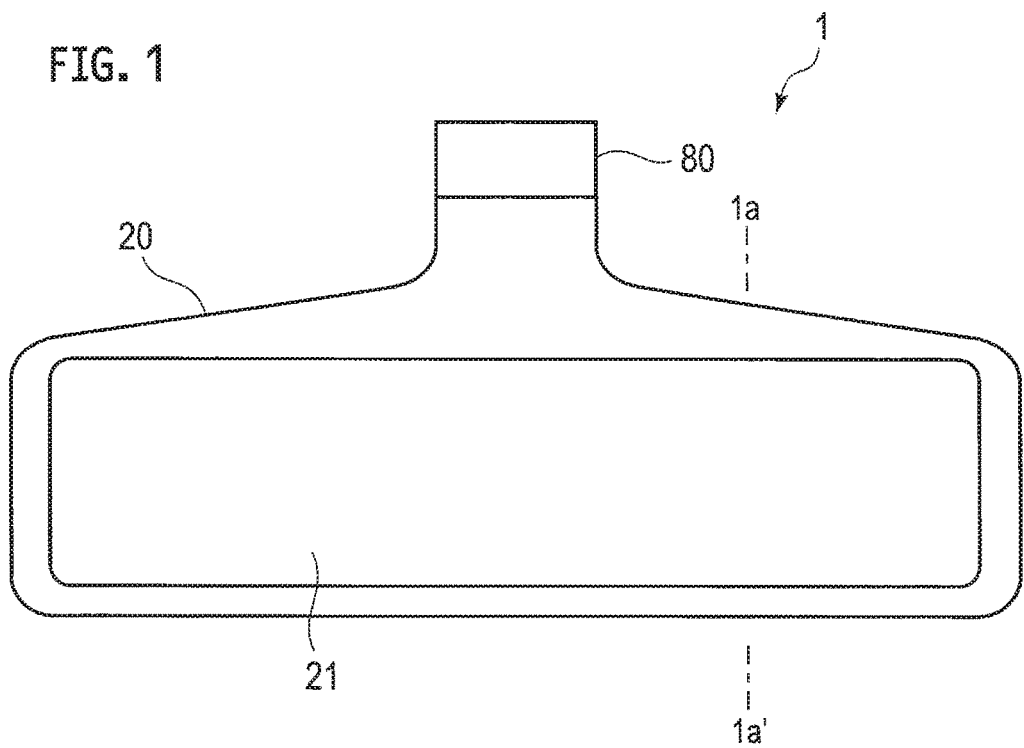
FIG. 1 is an external view of a room mirror with a display function according to the first embodiment.

A mirror device 10 with a display function according to the first embodiment will be described below. FIG. 1 is an external view of a room mirror 1 with a display function according to the first embodiment, when viewed from a mirror surface 21 as a front. Similarly to a normal room mirror, the room mirror 1 with a display function is mounted on the upper part of a windshield or the like in the traveling direction side of a vehicle viewed by the user.

In the external view of FIG. 1, a room mirror 1 with a display function includes the mirror surface 21 of a half mirror that reflects the rear landscape to the user, a cover 20 that covers the mirror surface 21 and functions as a housing, and a rotating support portion 80 that rotatably supports the room mirror 1 with a display function.

Figure 2:
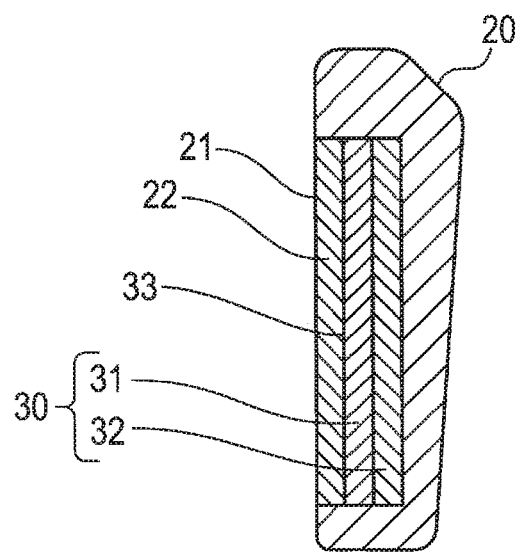
FIG. 2 is a cross-sectional view of the room mirror with a display function according to the first embodiment.

FIG. 2 is a schematic sectional view taken along line 1a-1a' of the room mirror 1 with a display function as illustrated in FIG. 1.

As illustrated in FIG. 2, the mirror surface 21 is a surface constituted by a half mirror 22. A liquid crystal panel 31 and a backlight 32, having substantially the same shape as the half mirror 22, are disposed on the inner side of the cover 20 (on the rear side of the half mirror 22). The liquid crystal panel 31 and the backlight 32 constitute a display panel 30. A display surface 33 is a surface constituted by the display panel 30.

The display panel 30 may be a spontaneous emission display panel such as an organic EL (Electro Luminescence) panel, instead of a combination of the liquid crystal panel 31 and the backlight 32, as long as having a configuration in which the image to be displayed is displayed by light emission. In FIG. 2, for example, a power circuit for driving the display panel 30 is not illustrated.

In the room mirror 1 with a display function illustrated in FIGS. 1 and 2, the backlight 32 is not turned on when the display panel 30 is not being displayed, so that the half mirror 22 reflects most of the light incident on the mirror surface 21. Therefore, the room mirror 1 with a display function operates as a mirror mode in which the user confirms the rear side by reflection of the mirror surface 21.

In the room mirror 1 with a display function, the backlight 32 is turned on when the display panel 30 is being displayed, so that the light emitted from the backlight 32 penetrates the half mirror 22 through the liquid crystal panel 31. Therefore, the room mirror 1 with a display function operates in a display mode in which the display panel 30 displays an image.

Figure 3:
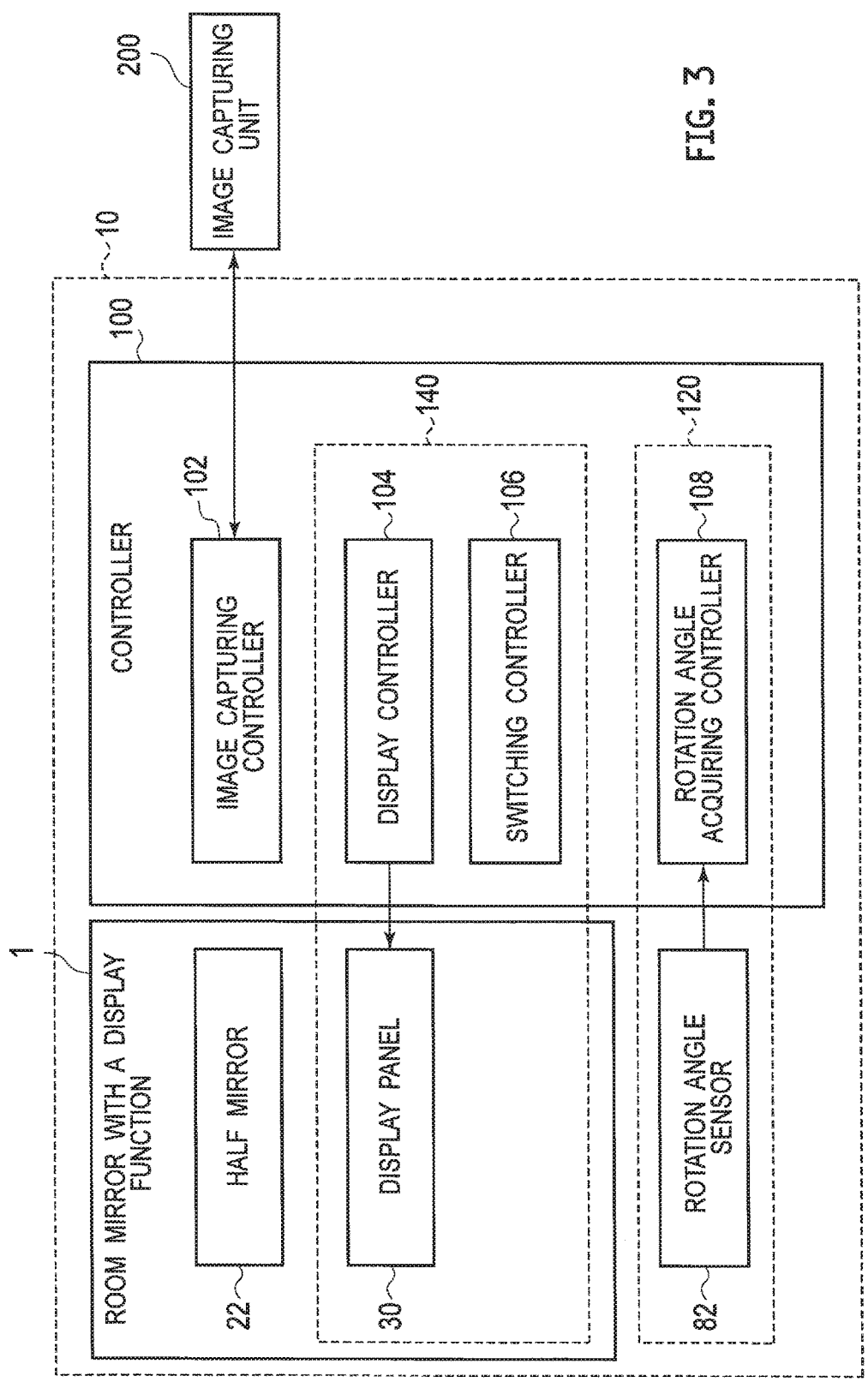
FIG. 3 is a functional block diagram of a mirror device with a display function according to the first embodiment.

FIG. 3 is a functional block diagram of the mirror device 10 with a display function according to the first embodiment. The mirror device 10 with a display function includes the room mirror 1 with a display function, a controller 100 that processes various types of data, and a rotation angle sensor 82.

Upon operating in a display mode, the room mirror 1 with a display function displays the image captured by an image capturing unit 200 on the display panel 30. The image capturing unit 200 is a camera that captures the rear side of the vehicle on which the mirror device 10 with a display function is mounted.

The controller 100 includes a central processing unit (CPU) or a digital signal processor (DSP) that processes various types of data, a memory, and the like. The controller 100 may be built in the room mirror 1 with a display function, or may use a control function of a navigation device, an on-vehicle computer, or the like.

The controller 100 includes an image capturing controller 102, a display controller 104, a switching controller 106, and a rotation angle acquiring controller 108, based on functions thereof. Each of the functions may be realized by a control function mounted on a single device, or may be realized by a control function mounted on a plurality of distributed devices.

The rotation angle sensor 82 is a sensor that is built in the rotating support portion 80 of the room mirror 1 with a display function, and outputs a signal based on a rotation angle of the room mirror 1 with a display function. Although not being limited, as a specific example, the form of the rotation angle sensor 82 is formed by, for example, a magnet attached to the rotating part of the rotating support portion 80, a Hall element attached to a non-rotating part thereof, and a microcomputer that outputs the output of the Hall element to the controller 100.

The display panel 30, the display controller 104, and the switching controller 106 form a switching unit 140. In addition, the rotation angle sensor 82 and the rotation angle acquiring controller 108 form the direction detection unit 120 that detects the direction of the room mirror 1 with a display function.

The image capturing controller 102 performs, for example, the turning ON/OFF of the image capturing unit 200 or processing of the image data captured by the image capturing unit 200. Basically, the image capturing unit 200 continuously captures while the vehicle on which the mirror device 10 with a display function is mounted, but may be controlled to be operated only during a necessary period, for example, an operating period of a display mode by the control of the image capturing controller 102.

As examples of processes of the image data captured by the image capturing unit 20, the image capturing controller 102 performs encoding of image data, image quality adjustment, and the like.

The display controller 104 performs a process of causing the display panel 30 to display the image data acquired by the image capturing controller 102. Specifically, the display controller 104 cuts out the image data according to the shape of the display panel 30, or adjusts the luminance or color tone of the image displayed on the display panel 30.

Further, the display controller 104 constitutes a part of the switching unit 140, and controls the display of the display panel 30 and the ON/OFF of the backlight 32 according to the control of the switching controller 106.

In accordance with the output value of the rotation angle sensor 82 acquired by the rotation angle acquiring controller 108, the switching controller 106 determines whether the room mirror 1 with a display function operates as a mirror mode or a display mode and performs a switching control.

As the specific switching control of the switching controller 106, when the room mirror 1 with a display function operates as the mirror mode, the switching controller 106 causes the display controller 104 to stop the display of the image on the liquid crystal panel 31 forming the display panel 30, and stops the switching ON of the backlight 32.

When the room mirror 1 with a display function operates as the mirror mode, the display controller 104 causes the liquid crystal panel 31 to display the image data acquired by the image capturing controller 102, and turns on the backlight 32.

The switching between the mirror mode operation and the display mode operation may be performed only by the ON/OFF of the backlight 32, while the display on the liquid crystal panel 31 continues.

The rotation angle acquiring controller 108 acquires a signal based on the rotation angle output from the rotation angle sensor 82, and outputs the signal, as rotation angle information, to the switching controller 106.

An operation example of the first mirror device 10 with a display function will be described below with reference to a flowchart illustrated in FIG. 4.

First, the direction detection unit 120 detects whether the direction (angle) of the room mirror 1 with a display function is changed (step S101). It is detected in step S101 whether the direction is changed when the rotating support portion 80 is rotated by an external force and the rotation angle acquiring controller 108 acquires the fact that the output of the rotation angle sensor 82 forming the direction detection unit 120 fluctuates.

When it is determined in step S101 that the direction of the room mirror 1 with a display function is changed (Yes in step S101), the switching unit 140 determines if the direction of the room mirror 1 with a display function changed in step S101 is in the range of a predetermined angle (step S102).

When it is determined in step S101 that the direction of the room mirror 1 with a display function is not changed (No in step S101), the process of step S101 is continued. In the process of step S101, the presence or absence of angle change may be continuously detected at predetermined time intervals, for example, 1 millisecond, or a process after step S102 may be started as triggered by the angle change.

The range of the predetermined angle used in the process of step S102 is an angle that is stored beforehand in a memory or the like, included in the controller 100 and detected by the rotation angle sensor 82 and data associated with whether the room mirror operates as the display mode or the mirror mode for each angle.

When it is determined in step S102 that the direction is in the range of the predetermined angle (Yes in step S102), the switching unit 140 determines whether the room mirror 1 with a display function is operating as the display mode (step S103). When it is determined that the room mirror 1 is operating as the display mode (Yes in step S103), the switching unit 140 causes the room mirror 1 with a display function to operate as the mirror mode (step S104), and this process ends.

When it is determined in step S103 that the room mirror 1 is operating as the mirror mode rather than the display mode (No in step S103), the mode change is not necessary, and thus this process ends.

When it is determined in step S102 that the direction is not in the range of the predetermined angle (No in step S102), the switching unit 140 determines whether the room mirror 1 with a display function is operating as the mirror mode (step S105). When it is determined that the room mirror 1 is operating as the mirror mode (Yes in step S105), the switching unit 140 causes the room mirror 1 with a display function to operate as the display mode (step S106).

When it is determined in step S105 that the room mirror 1 is operating as the display mode rather than the mirror mode (No in step S103), the mode change is not necessary, and thus this process ends.

The description will be given below with reference to FIGS. 5 to 7, with respect to data defining the range of the predetermined angle used for the determination in step S102. FIG. 5 illustrates an example of corresponding data between a detection angle stored beforehand in the memory or the like, included in the controller 100 and an operation mode.

As an example, FIG. 5 illustrates a case where a movable range of the room mirror 1 with a display function due to the rotation of the rotating support portion 80 is ±20°. In FIG. 5, the term "0°" indicates a state where the mirror surface 21 of the room mirror 1 with a display function faces backward in the traveling direction at an angle perpendicular to the traveling direction of the vehicle to which the room mirror 1 with a display function is attached, the rotation in the right direction from 0° is defined as "+", and the rotation in the left direction from 0° is defined as "−".

In FIG. 5, the room mirror 1 with a display function operates as the mirror mode when the movable range of the room mirror 1 with a display function is in the range from −20° to +8°, and operates as the display mode when the movable range thereof is in the range of +10 to +20°. Although the detection angle is stepped by 2° as an example of one step, only an angle of a threshold value, at which the mode is changed may be stored, and the detection angle may be stepped by a finer angle.

In FIG. 5, the range of the mirror mode includes the range from an angle at which a driver appropriately checks the rear side reflected on the mirror surface 21 of the half mirror 22 to an angle at which a person sitting in the passenger seat checks the rear side reflected on the mirror surface 21 even when the driver does not see.

In FIG. 5, as an example, a case is illustrated in which the driver of the vehicle equipped with the room mirror 1 with a display function is seated in the right seat, and the range from −20° to −10° is set as the display mode in a case where the driver is seated in the left seat.

The range from −20° to −10° and the range from +10° to +20° may be set as the display mode so as to correspond to either of the left or right driver positions. The data illustrated in FIG. 5 may be fixed, or may be changed by user's setting or operation.

Figure 6:
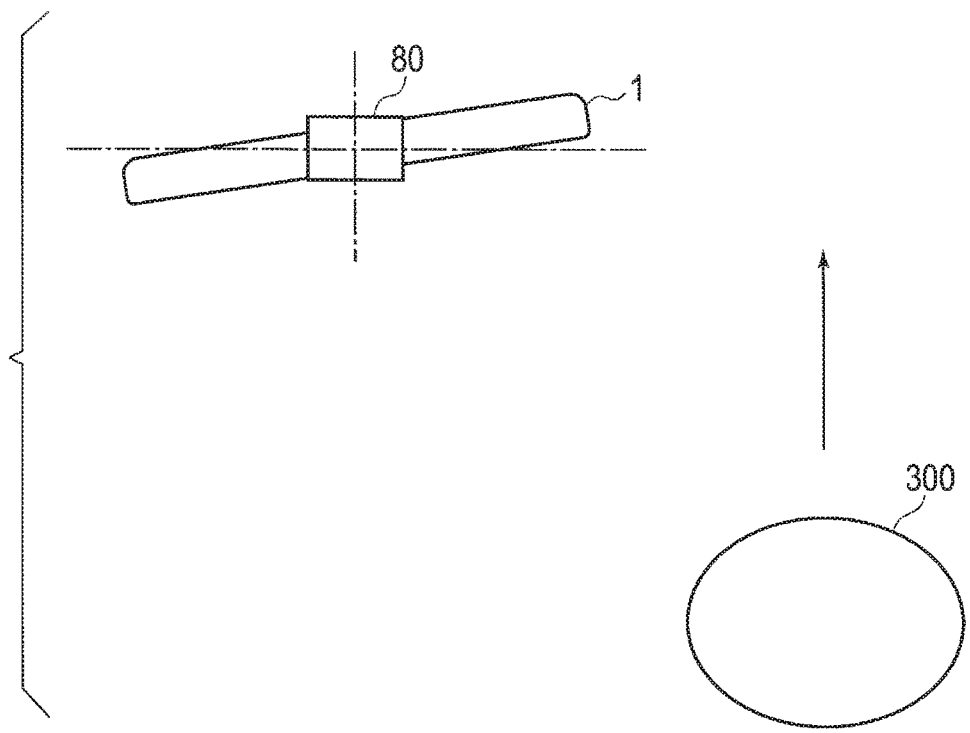
FIG. 6 is a diagram illustrating an example of a direction in which the mirror device with a display function according to the first embodiment operates as a mirror mode.

FIG. 6 is a conceptual diagram illustrating a direction of the room mirror when the room mirror 1 with a display function operates as a mirror mode. FIG. 7 is a conceptual diagram illustrating a direction of the room mirror when the room mirror 1 with a display function operates in a display mode. FIGS. 6 and 7 illustrate an example of a vehicle in which a driver 300 is seated in the right seat. When the driver is seated in the left seat, directions become bilaterally-symmetrical to each other.

Figure 7:
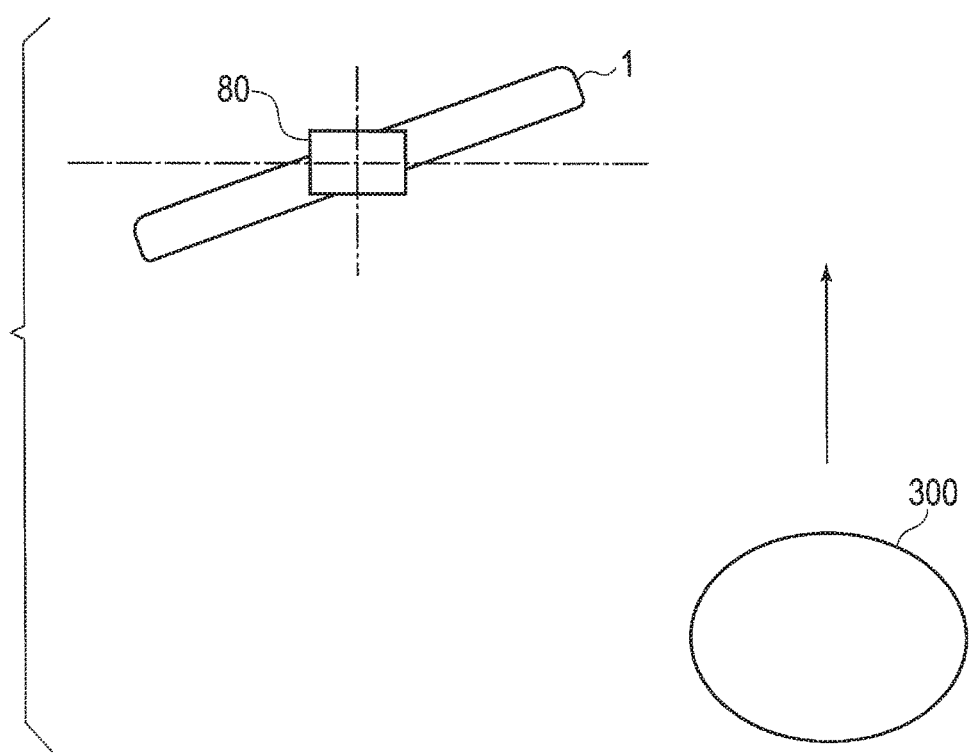
FIG. 7 is a diagram illustrating an example of a direction in which the mirror device with a display function according to the first embodiment operates in a display mode.

The direction in the mirror mode, illustrated in FIG. 6, is a direction in which the rear side of the vehicle is reflected on the mirror surface 21 and the reflected image is directed toward the driver 300 as the user, and the direction in the display mode illustrated in FIG. 7 indicates the angle at which the display surface 33 faces the driver 300.

In FIGS. 6 and 7, the arrow indicates the front of the driver 300 and the front of the vehicle. Furthermore, a dashed line superimposed on the room mirror 1 with a display function in FIGS. 6 and 7 indicates that a vertical line in the drawings match the traveling direction in front of the vehicle, and a horizontal line matches the angle of 0° of the room mirror 1 with a display function.

In the first embodiment described above, the room mirror 1 with a display function operates in an appropriate operation mode with respect to the change in operation of the direction of the room mirror 1 with a display function by the user. For this reason, it is possible to use an operation mode conforming to the purpose of the user without manually changing the operation mode, in addition to the change of the direction of the room mirror 1 with a display function.

A mirror device with a display function 11 according to the second embodiment will be described below. In the description of the second embodiment, the configuration and process similar to those of the first embodiment may be omitted.

Figure 8:
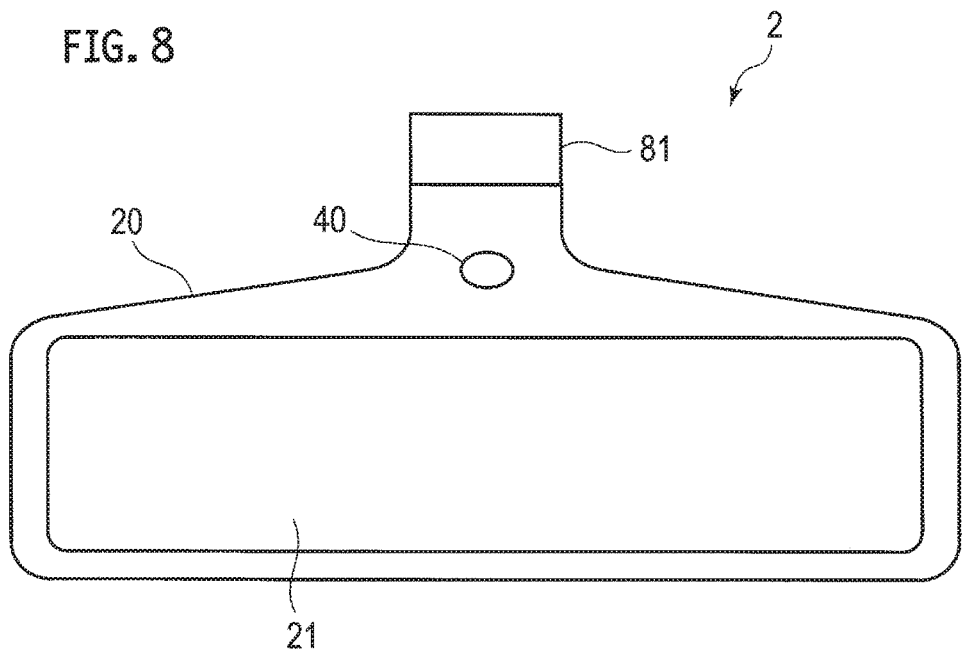
FIG. 8 is an external view of a room mirror with a display function according to the second embodiment.

FIG. 8 is an external view of a room mirror 2 with a display function according to the second embodiment as viewed from the front of the mirror surface 21, and the mounting position and usage thereof are similar to those of the room mirror 1 with a display function according to the first embodiment.

The room mirror 2, with a display function according to the second embodiment, is similar to the room mirror 1 with a display function according to the first embodiment, except that a rotating support portion 81 having a different configuration is provided instead of the rotating support portion 80, and the cover 20 is provided with a motion sensor 40.

The rotating support portion 81 includes a rotation angle sensor 82, as in the rotating support portion 80, and further includes a rotation mechanism unit 84 (illustrated in FIG. 10) for rotating the room mirror 2 with a display function. The rotation angle sensor 82 and the rotation mechanism unit 84 may be provided in the rotating support portion 81, for example, and may be used as the rotation angle sensor 82 by replacing a drive signal to the stepping motor or the number of rotation with a rotation angle when the drive source of the rotation mechanism unit 84 is driven by a stepping motor.

The motion sensor 40 is used to detect motion in order to receive the user's operation as motion. The motion sensor 40 is disposed above the center of the room mirror 2 with a display function, but may be disposed at a position away from the room mirror 2 with a display function regardless of disposition places, as long as the motion sensor 40 can appropriately recognize the motion of the user's operation without being mistakenly recognized.

Figure 9:
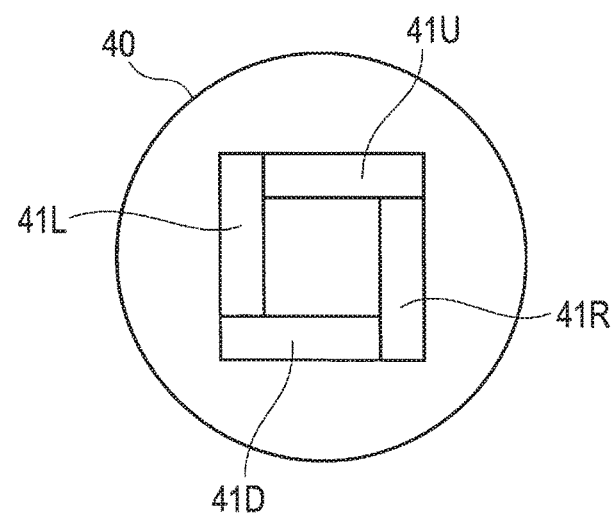
FIG. 9 is a conceptual diagram of a motion sensor used for the room mirror with a display function according to the second embodiment.

FIG. 9 conceptually illustrates the motion sensor 40 used by the room mirror 2 with a display function. The motion sensor 40 is a sensor in which a plurality of photodiodes are combined and can detect motion in four directions when the sensor is configured by the combination of four photodiodes.

The motion sensor 40 includes an up direction detecting photodiode 41U, a down direction detecting photodiode 41D, a left direction detecting photodiode 41L, and a right direction detecting photodiode 41R therein. The up, down, left, and right directions of each photodiode coincide with those of the room mirror 2 with a display function viewed from a user, as illustrated in FIG. 8. Such a motion sensor 40 can detect an object in the range from 0.1 m to 0.2 m ahead of the motion sensor 40.

Figure 10:
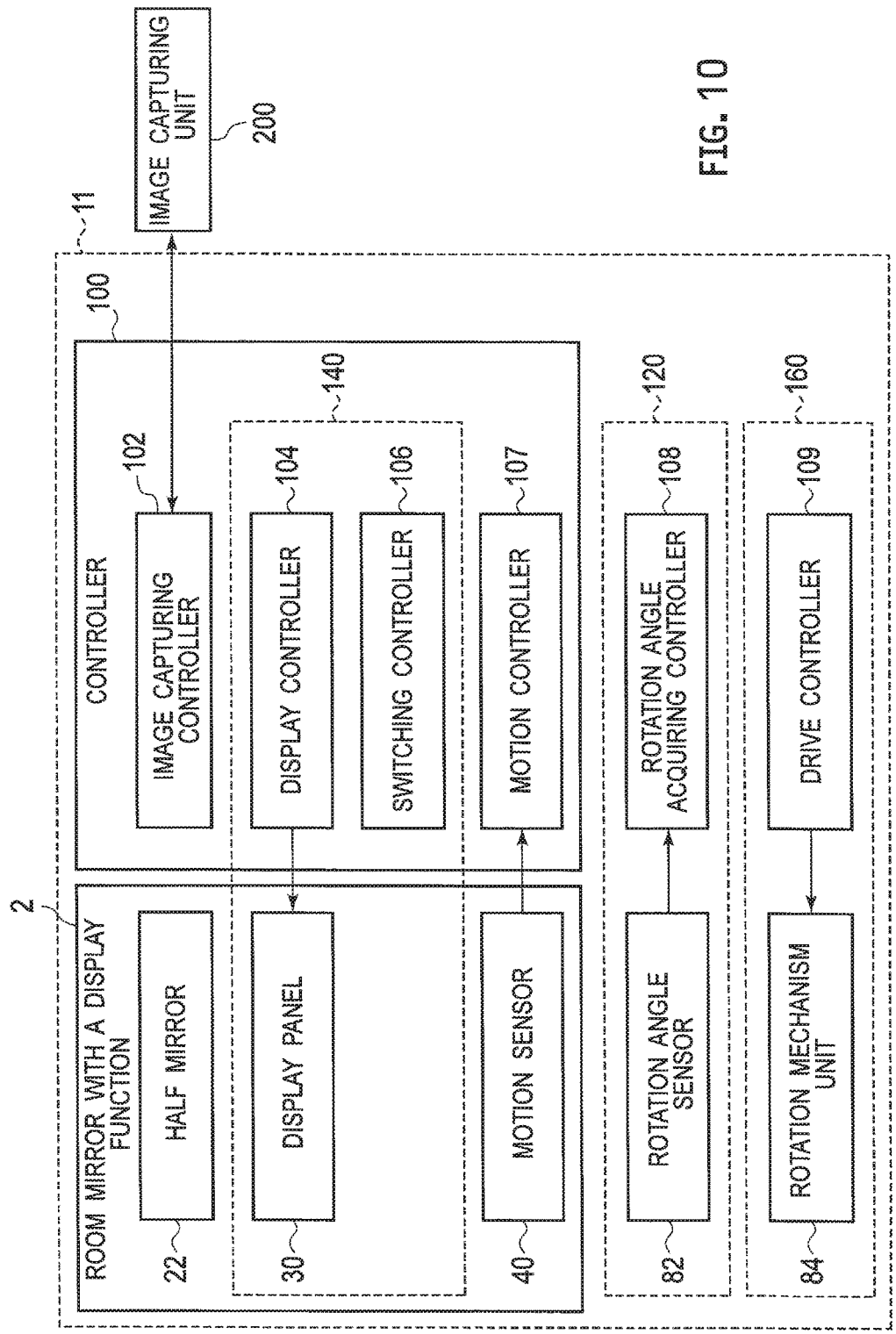
FIG. 10 is a functional block diagram of a mirror device with a display function according to the second embodiment.

FIG. 10 is a functional block diagram of the mirror device with a display function 11 according to the second embodiment. The mirror device with a display function 11 includes the room mirror 2 with a display function, a controller 100 that processes various types of data, the rotation angle sensor 82, and the rotation mechanism unit 84. The controller 100 further includes a motion controller 107 and a drive controller 109 based on the functions thereof.

The motion controller 107 acquires output signals from the motion sensor 40, and detects a motion direction or the like. The motion controller 107 analyzes distribution of the peak values of waveforms of the object detected by four photodiodes of the motion sensor 40, and detects whether the object passes in any of the up, down, left, or right directions at the front of motion sensor 40.

Further, the motion controller 107 can detect a reciprocating motion of the object in the up-and-down direction when continuously detecting within a predetermined time that the object passes in the up-and-down direction. Likewise, the motion controller 107 can detect a reciprocating motion of the object in the left-and-right direction.

The motion controller 107 constantly acquires an output value from each of the photodiodes of the motion sensor 40 during a period of motion detection. The motion controller 107 acquires an output value Uout in the up direction detecting photodiode 41U, an output value Dout in the down direction detecting photodiode 41D, an output value Lout in the left direction detecting photodiode 41L, and an output value Rout in the right direction detecting photodiode 41R.

For example, the motion controller 107 determines a motion direction from peak waveforms of the (Uout−Dout)/(Uout+Dout) and (Rout−Lout)/(Rout+Lout). In addition, the motion controller 107 determines that there is a reciprocating motion when detecting a motion direction opposite to the determined motion direction within a predetermined time set to one to two seconds, for example.

The drive controller 109 controls the operation of the rotation mechanism unit 84 using the detection result obtained by the motion controller 107 as a trigger for driving the rotation mechanism unit 84. Specifically, based on the detection result obtained by the motion controller 107, the drive controller 109 controls the rotation mechanism unit 84 to rotate the room mirror 2 with a display function in the motion direction detected by the motion controller 107. The rotation mechanism unit 84 and the drive controller 109 form a drive unit 160.

Figure 11:
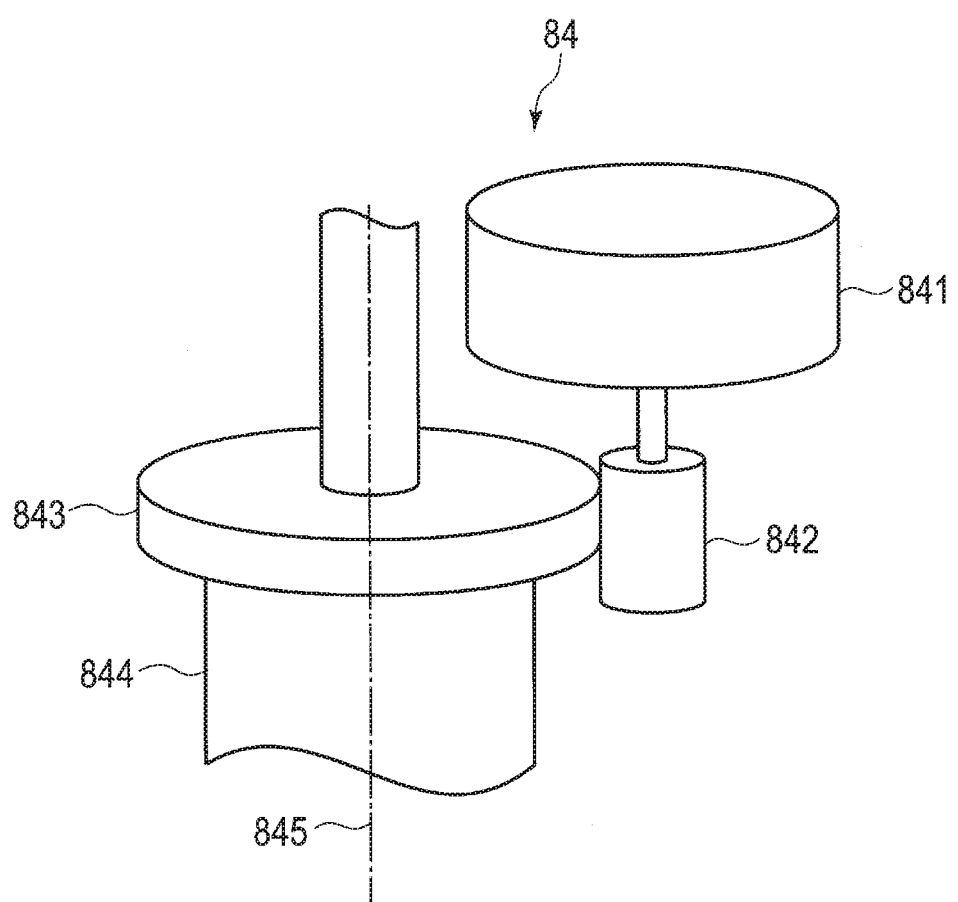
FIG. 11 is a perspective view illustrating a configuration example of a rotation mechanism unit of the room mirror with a display function according to the second embodiment.

FIG. 11 illustrates a configuration example of the rotation mechanism unit 84. The rotation mechanism unit 84 operates based on an instruction signal from the drive controller 109. As a specific example, the rotation mechanism unit 84 includes a drive motor 841, a drive gear 842, a mirror-side gear 843, and a mirror coupling unit 844.

The rotation mechanism unit 84 is configured such that the drive motor 841 rotates by the prescribed number of rotations based on the instruction signal from the drive controller 109, the drive gear 842 transmits the rotation of the drive motor 841 to the mirror-side gear 843, and the mirror coupling unit 844 rotates on a mirror rotation shaft 845 by a prescribed angle. The mirror coupling unit 844 forms a part of the cover 20 or is directly attached to the cover 20.

The rotation mechanism unit 84 is not limited to the above configuration, and various drive mechanisms are applicable to the rotation mechanism unit 84. For example, a stepping motor can be used.

An operation example of the second mirror device with a display function 11 will be described below, with reference to the flowchart illustrated in FIG. 12.

First, the motion controller 107 determines whether motion is detected (step S201). It can be determined in step S201 whether motion is detected, depending on whether motion is detected in any direction in a state where the motion controller 107 detects the signal from the motion sensor 40. When it is determined in step S201 that motion is not detected (No in step S201), the process of the step S201 is continuously performed.

When it is determined in step S201 that motion is detected (Yes in step S202), the motion controller 107 determines whether the detected motion is in the left direction (step S202).

When it is determined in step S202 that motion is detected in the left direction (Yes in step S202), the drive unit 160 rotates the room mirror 2 with a display function counter-clockwise by a predetermined angle (step S203).

When it is determined in step S202 that the motion is not detected in the left direction (No in step S202), the motion controller 107 determines whether the detected motion is in the right direction (step S204).

When it is determined in step S204 that motion is detected in the right direction (Yes in step S204), the drive unit 160 rotates the room mirror 2 with a display function clockwise by a predetermined angle (step S205).

When it is determined in step S204 that motion is not detected in the right direction (No in step S204), motion detected in step S101 is neither in the left direction nor in the right direction, whereby the process returns to step S201, or moves to a process associated with a motion in the up direction or the down direction as an example of another direction.

Processes subsequent to steps S203 and step S205 are similar to those in the first embodiment as illustrated in FIG.

4, and thus steps S206, S207, S208, S209, and S210 correspond to steps S102, S103, S104, S105, and S106, respectively.

In steps S203 and S205, the predetermined angle is arbitrary at which the room mirror 2 with a display function is rotated by the drive unit 160. For example, the room mirror 2 with a display function rotates by 4° at a time according to the detection of motion in the left direction or the right direction.

In such an example, when the room mirror 2 with a display function is at an angle of +2° which is the operation range of the mirror mode, it rotates up to an angle of +10° by continuous detection of motion in the right direction two times. In this case, the mode is switched to the display mode by the processes from step S102 to step S106.

In the second embodiment described above, the user changes the direction of the room mirror 2 with a display function using motion, and the room mirror 2 with a display function operates in an appropriate operation mode according to the changed direction. For this reason, the user can intuitively change the direction of the room mirror 2 with a display function, and it is possible to use an operation mode conforming to the purpose of the user without manually changing the operation mode.

A modified operation example of the mirror device with a display function 11 according to the second embodiment will be described below, with reference to the flowchart illustrated in FIG. 13.

Figure 12:
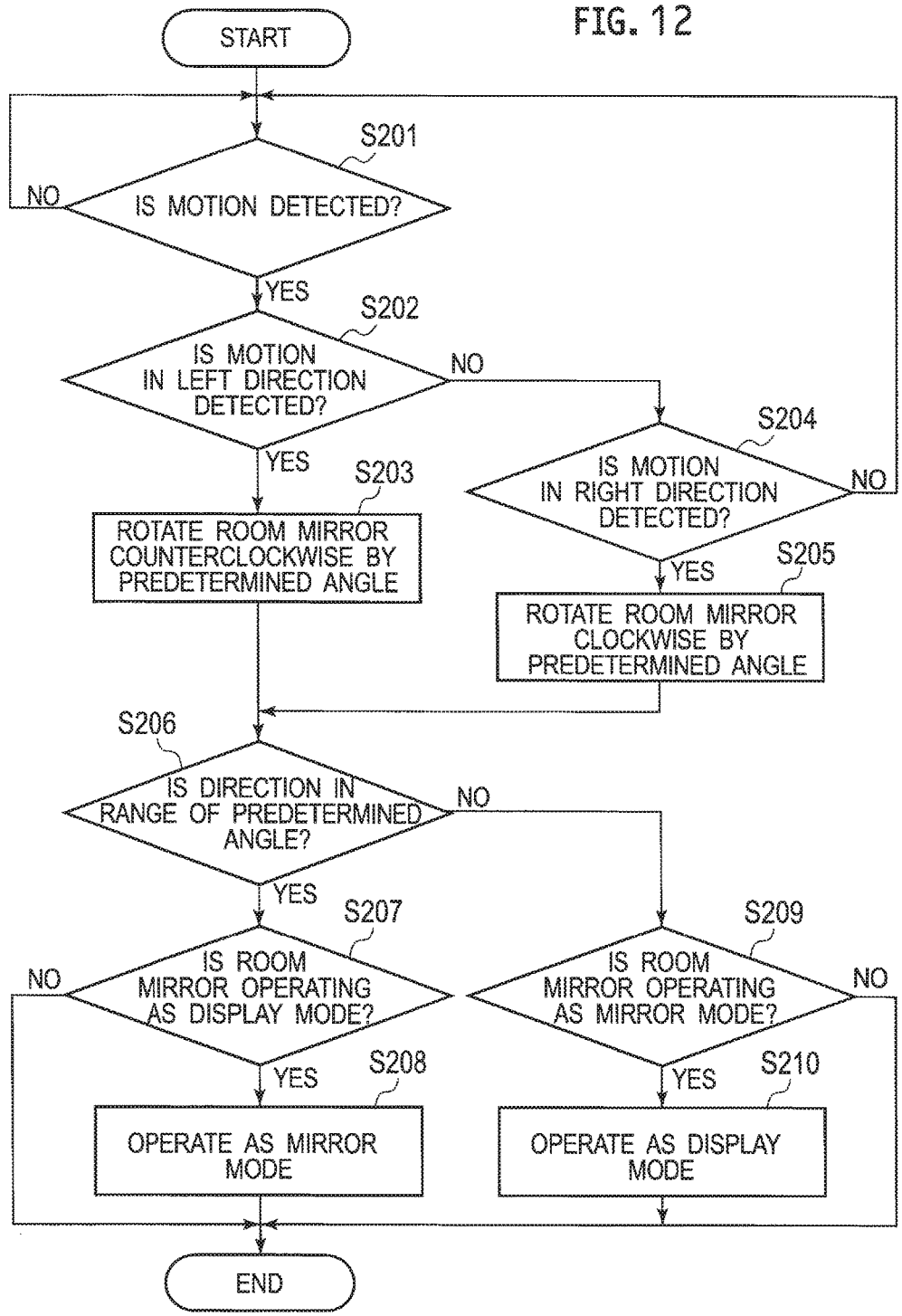
FIG. 12 is a flowchart illustrating a method of changing a function of the mirror device with a display function according to the second embodiment.

Processes of steps S301, S302, and S307 are similar to the processes of steps S201, S202, and S204 in FIG. 12.

When it is determined in step S302 that motion is detected in the left direction (Yes in step S302), the switching unit 140 determines whether the room mirror 2 with a display function operates as the display mode (step S303).

When it is determined in step S303 that the room mirror 2 with a display function operates as the display mode (Yes in step S303), the drive unit 160 rotates the room mirror 2 with a display function counterclockwise up to the operation angle of the mirror mode (step S304), and the switching unit 140 causes the room mirror 2 with a display function to operate as the mirror mode (step S305), whereby this process ends.

In the process of step S304, for example, when the room mirror 2 with a display function is at an angle of +18° which is the operation range of the display mode, the drive unit 160 rotates the room mirror 2 with a display function up to an angle of +80, which is the operation range of the mirror mode, by detection of motion in the left direction at the time.

When it is determined in step S303 that the room mirror 2 with a display function does not operate as the display mode (No in step S303), the drive unit 160 rotates the room mirror 2 with a display function counterclockwise at a predetermined angle, similarly to step S203 in FIG. 12 (step S306).

When it is determined in step S307 that motion is detected in the right direction (Yes in step S307), the switching unit 140 determines whether the room mirror 2 with a display function operates as the mirror mode (step S308).

When it is determined in step S308 that the room mirror 2 with a display function operates as the mirror mode (Yes in step S308), the drive unit 160 rotates the room mirror 2 with a display function counterclockwise up to the operation angle of the display mode (step S309), and the switching unit 140 causes the room mirror 2 with a display function to operate as the display mode (step S310), whereby this process ends.

In the process of step S309, for example, when the room mirror 2 with a display function is at an angle of −4° which is the operation range of the mirror mode, the drive unit 160 rotates the room mirror 2 with a display function up to an angle of +10°, which is the operation range of the display mode, by detection of the motion in the right direction at the time.

When it is determined in step S308 that the room mirror 2 with a display function does not operate as the mirror mode (No in step S308), the drive unit 160 rotates the room mirror 2 with a display function clockwise at a predetermined angle, similarly to step S205 in FIG. 12 (step S311).

In the modified example of the second embodiment described above, the user changes the direction of the room mirror 2 with a display function using motion, and the room mirror 2 with a display function operates in an appropriate operation mode according to the changed direction. For this reason, the user can intuitively change the direction of the room mirror 2 with a display function, and it is possible to use an operation mode conforming to the purpose of the user without manually changing the operation mode.

When operating as the display mode, the room mirror 1 with a display function and the room mirror 2 with a display function display a rear image from the vehicle captured by the image capturing unit 200. For this reason, the room mirror 1 with a display function and the room mirror 2 with a display function can replace a normal room mirror by operating as the display mode. Therefore, the room mirror 1 with a display function and the room mirror 2 with a display function preferably operates as the display mode as a normal operation.

Figure 4:
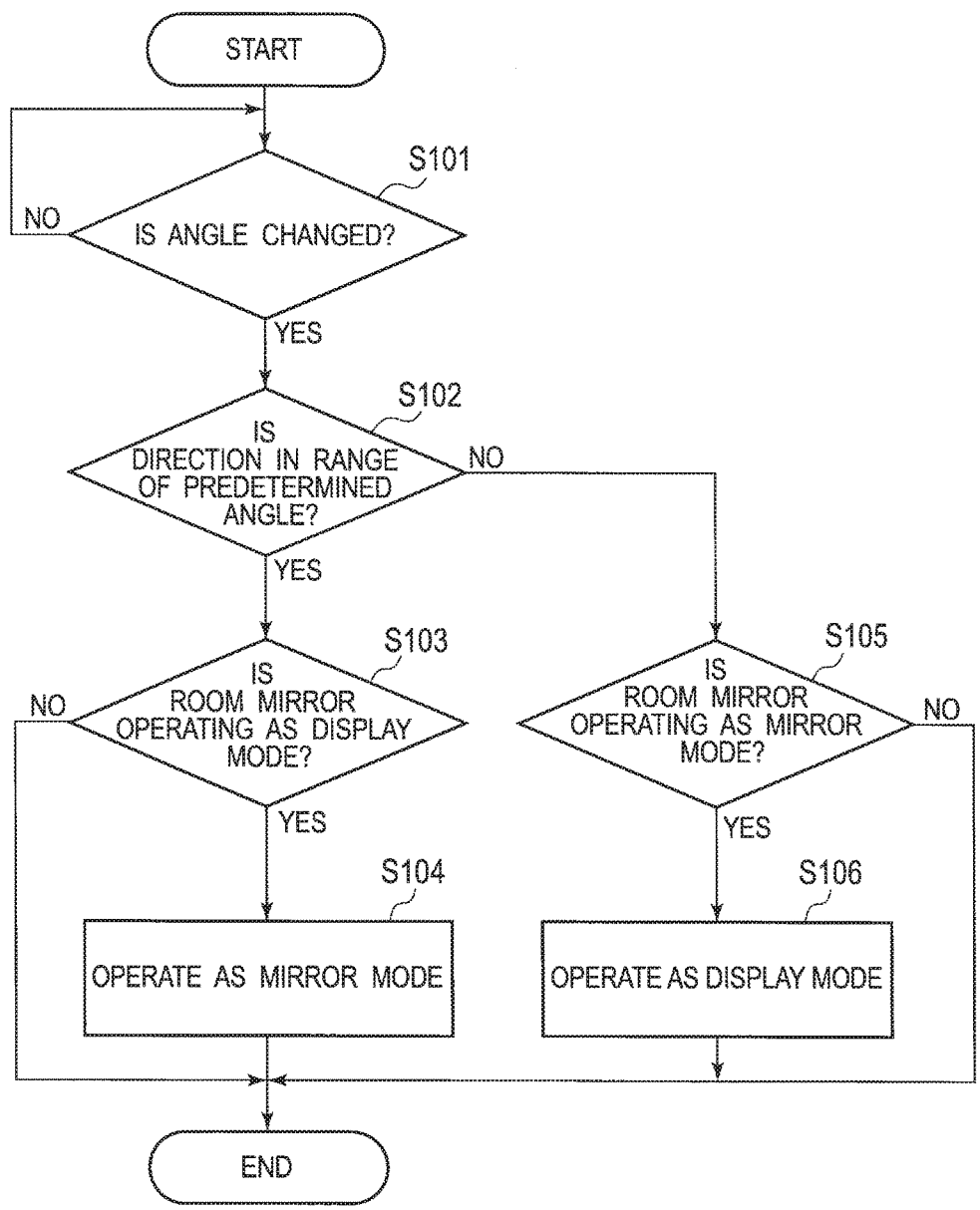
FIG. 4 is a flowchart illustrating a method of changing a function of the mirror device with a display function according to the first embodiment.

For this reason, when the mode is changed to the mirror mode from the display mode by the process of step S104 in FIG. 4, step S208 in FIG. 12, or step S305 in FIG. 13, the switching unit 140 may perform a process of operating the room mirror 1 with a display function and the room mirror 2 with a display function in the display mode after a predetermined time passes from the change time. In this case, an example of the predetermined time is 3 seconds or 5 seconds.

At this time, the drive unit 160 may rotate the room mirror 2 with a display function up to the operation angle as the display mode. Alternatively, the drive unit 160 may store an angle at the time of the operation as the display mode before the operation as the mirror mode, and may rotate the room mirror 2 with a display function up to the stored angle.

The image capturing unit 200 is mainly attached to be positioned outside the rear side of the vehicle. Since the rear image of the vehicle captured by the image capturing unit 200 is displayed on the room mirror 1 with a display function and the room mirror 2 with a display function which is operating as the display mode, the interior of the vehicle can hardly be checked with the room mirror 1 with a display function and the room mirror 2 with a display function. For this reason, it is necessary for the user to operate the room mirror 1 with a display function and the room mirror 2 with a display function as the mirror mode in the case of checking the interior of the passenger compartment.

When the automatic switching operation from the mirror mode to the display mode is added as described above, since the room mirror is switched to operate as the display mode after a predetermined time passes even when temporarily operating in the mirror mode, the rear side of the vehicle is safely checked.

A mirror device with a display function according to a third embodiment will be described below. A mirror device with a display function according to the third embodiment has a configuration similar to that of the mirror device 10 with a display function according to the first embodiment or the mirror device with a display function 11 according to the second embodiment, but will conveniently be described as the mirror device 10 with a display function, and will not be described by illustration.

Since the room mirror with a display function also has a configuration similar to that of the room mirror 1 with a display function according to the first embodiment or the room mirror 2 with a display function according to the second embodiment, it will conveniently be described as the room mirror 1 with a display function and not be described by illustration.

The mirror device 10 with a display function according to the third embodiment is different from in the first embodiment or the second embodiment in terms of the operation of the display controller 104.

When the direction of the room mirror 1 with a display function is changed by hand or by the operation of the drive unit 160, after the direction detection unit 120 detects the direction change, a period of direction change from 2 seconds to 5 seconds, for example, is generated from the start of the direction change to the end of the direction change.

The switching unit 140 performs switching between the mirror mode and the display mode at a desired timing for the period of direction change. The switching between the mirror mode and the display mode is performed in the middle of the period of direction change, during the operation period of the display mode, even though the direction change is performed, and the image displayed on the display panel 30 faces in a fixed direction regardless of the direction change.

For this reason, at the time of the switching between the mirror mode and the display mode, the check range in which the rear side of the vehicle is checked by the reflection of the half mirror 22 greatly deviates from the viewing position due to the rear image being displayed on the display panel, and there is sometimes a sense of incompatibility.

FIGS. 14A to 14F conceptually illustrate states where the display controller 104 changes and cuts out a cutout area 501 of a rear image 500 of the vehicle acquired by the image capturing controller 102, and captured by the image capturing unit 200. In the third embodiment as in the other embodiments, the case where the driver of the vehicle equipped with the room mirror 1 with a display function is seated in the right seat is also described as an example.

Figure 14A:
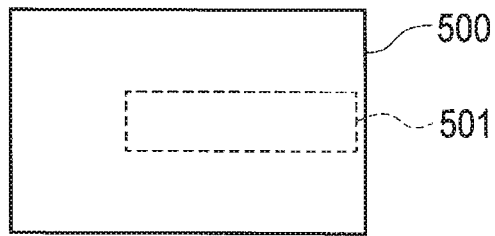
FIGS. 14A to 14F are diagrams illustrating examples of cutting out a capturing range in the third embodiment.
Figure 14B:
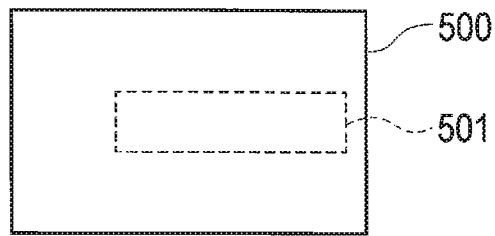
Figure 14C:
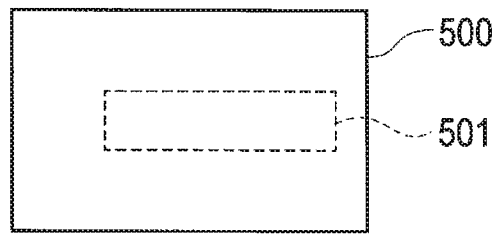
Figure 14D:
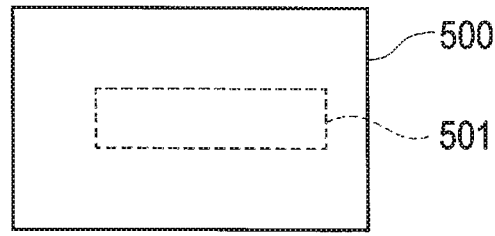
Figure 14E:
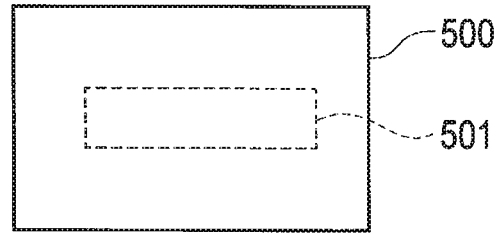
Figure 14F:
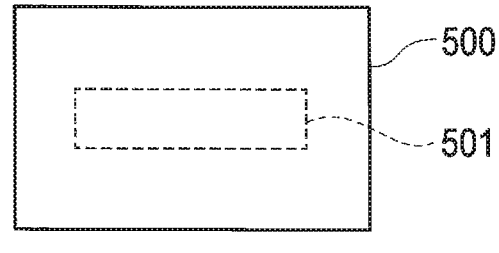

In FIGS. 14A to 14F, the rear image 500 of the vehicle is captured to face the rear side of the vehicle. Therefore, the cutout area 501 in FIG. 14A is a cutout area biased toward the left when viewed from the rear side of the vehicle. Similarly, the cutout area 501 in FIG. 14F is a cutout area that faces the center of the rear side of the vehicle. In FIGS. 14A to 14F, the cutout area is illustrated for convenience in such a manner of being changed stepwise from FIG. 14A to FIG. 14F, but is, in fact, appropriately changed continuously rather than stepwise.

In the examples of FIGS. 14A to 14F, the cutout area of the rear image 500 in FIG. 14A is defined as cutout area "a". Similarly, the cutout areas in FIGS. 14B to 14F are also defined as cutout area "b", cutout area "c", cutout area "d", cutout area "e", and cutout area "f", respectively.

FIG. 15 illustrates an example of corresponding data of a detection angle stored beforehand in the memory or the like included in the controller 100, an operation mode, and a display range. The detection angle and the operation mode illustrated in FIG. 15 are the same as those in FIG. 5, and thus the description thereof will not be presented.

At the detection angle detected by the direction detection unit 120, the display controller 104 cuts out the rear image 500 in the cutout area for the display of the display range corresponding to the detected direction, and displays the image on the display panel 30 in a range from +10° to +20°, which is the operation range of the display mode.

In the third embodiment, the display range corresponding to the detected direction is an angle at which the display surface 33 faces the driver when the detection angle is +20° and is associated with the cutout area in which the center of the rear side of the vehicle is displayed on the display panel 30.

When the detection angle is in a range from +18° to +10°, the rear image 500 is cut out in the cutout area biased in the direction corresponding to the change from the angle at which the display surface 33 faces the driver to the angle at which the display surface 33 faces the rear side of the vehicle, and is displayed on the display panel 30.

By such a process, at the time of the switching between the mirror mode and the display mode, the rear image displayed during the operation period of the display mode is displayed as a range following the operation of direction change. Accordingly, the check range in which the rear side of the vehicle is checked by the reflection of the half mirror 22 is aligned with the viewing position due to the rear image displayed on the display panel, and the sense of incompatibility can be reduced. The third embodiment is applicable to either the case of changing from the mirror mode to the display mode, or the case of changing from the display mode to the mirror mode.

According to the embodiments described above, the room mirror with a display function operable as the mirror mode and the display mode can be operated with an appropriate function according to the direction thereof.

The present invention is not limited to the first to third embodiments described above, and various modifications can be made without departing from the scope of the invention.

What is claimed is:

1. A mirror device with a display function, comprising:
   a room mirror with a display function including a display panel that displays an image, and a half mirror that is provided on a display surface of the display panel;
   a direction detection unit configured to detect a direction of the room mirror with a display function; and
   a switching unit configured to perform, according to the direction of the room mirror with a display function detected by the direction detection unit, switching between a mirror mode, in which the display of the image on the display panel is stopped and a mirror surface of the half mirror is used, and a display mode in which the image is displayed on the display panel, wherein
   when the display mode is temporarily changed to the mirror mode based on the direction of the room mirror with a display function detected by the direction detection unit, the switching unit changes the mirror mode to the display mode after a predetermined time passes from a change time when the display mode is changed.

2. The mirror device with a display function according to claim 1, wherein the switching unit causes the room mirror with a display function to operate as the mirror mode when the direction of the room mirror with a display function detected by the direction detection unit is a direction in which a user is capable of seeing a desired direction through the mirror surface, and causes the room mirror with a display function to operate in the display mode when the direction of the room mirror with a display function is a direction in which the display surface faces the user.

3. The mirror device with a display function according to claim 1, wherein the switching unit causes the room mirror with a display function to operate as the mirror mode when the direction of the room mirror with a display function detected by the direction detection unit is a direction in which a driver of a vehicle mounted with the room mirror with a display function is capable of seeing a rear side of the vehicle through the mirror surface, and causes the room mirror with a display function to operate in the display mode when the direction of the room mirror with a display function is a direction in which the display surface faces the driver.

4. The mirror device with a display function according to claim 1, further comprising:
a driver configured to change the direction of the room mirror with a display function, wherein the direction detection unit detects a direction change instruction of the room mirror with a display function, and drives the driver based on the detection of the direction change instruction.

5. The mirror device with a display function according to claim 1, wherein when the direction detection unit detects that the direction of the room mirror with a display function is continuously changed even after the mirror mode is switched to the display mode, the switching unit causes the display panel to display an image in a range corresponding to the direction of the room mirror with a display function detected by the direction detection unit.

6. A method of changing a function of a mirror device with a display function, the method comprising:
detecting a direction of a room mirror with a display function including a display panel that displays an image and a half mirror that is provided on a display surface of the display panel;
according to the detected direction of the room mirror with a display function, performing switching between a mirror mode, in which the display of the image on display panel is stopped and a mirror surface of the half mirror is used, and a display mode in which the image is displayed on the display panel; and
when the display mode is temporarily changed to the mirror mode based on the detected direction of the room mirror with a display function, automatically changing the mirror mode to the display mode after a predetermined time passes from a change time when the display mode is changed.

* * * * *